(12) United States Patent
Marchal

(10) Patent No.: US 12,370,768 B2
(45) Date of Patent: Jul. 29, 2025

(54) SUPPORT FOR A FIBROUS BLADE OR PROPELLER BLANK

(71) Applicant: SAFRAN AIRCRAFT ENGINES, Paris (FR)

(72) Inventor: Yann Didier Simon Marchal, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 216 days.

(21) Appl. No.: 17/859,606

(22) Filed: Jul. 7, 2022

(65) Prior Publication Data

US 2023/0050567 A1 Feb. 16, 2023

(30) Foreign Application Priority Data

Jul. 8, 2021 (FR) ...................................... 2107391

(51) Int. Cl.
*G06F 30/15* (2020.01)
*B29C 70/40* (2006.01)
(Continued)

(52) U.S. Cl.
CPC .......... *B29D 99/0025* (2013.01); *B29C 70/40* (2013.01); *B29C 70/48* (2013.01); *F01D 5/147* (2013.01); *G05B 19/4099* (2013.01); *G05B 19/41* (2013.01); *G06F 30/00* (2020.01); *G06F 30/15* (2020.01); *F05D 2220/30* (2013.01); *F05D 2230/20* (2013.01); *F05D 2240/30* (2013.01)

(58) Field of Classification Search
CPC ......... G06F 30/15; G06F 30/00; B29C 70/40; B29C 70/48; F01D 5/147; G05B 19/4099; G05B 19/41

USPC ............................................................ 703/2
See application file for complete search history.

(56) References Cited

U.S. PATENT DOCUMENTS 7,101,154 B2 9/2006 Dambrine et al.
7,241,112 B2 7/2007 Dambrine et al.
(Continued)

FOREIGN PATENT DOCUMENTS

FR 3 046 563 A1 7/2017
FR 3 046 564 B1 8/2018
WO WO 2010/061140 A1 6/2010

OTHER PUBLICATIONS

Search Report as issued in French Patent Application No. 2107391, dated Mar. 28, 2022.
(Continued)

*Primary Examiner* — Andre Pierre Louis
(74) *Attorney, Agent, or Firm* — Pillsbury Winthrop Shaw Pitman LLP

(57) ABSTRACT

A method for digitally designing a support with the shape of a fibrous blank obtained by three-dimensional weaving intended to form a fibrous preform of a turbine engine blade or propeller after shaping and compaction in a mold, includes
providing a set of points representative of a face of the fibrous blank, the face being intended to form the root of the blade or the propeller and a portion of an aerodynamic profile of the blade or the propeller, generating a web connecting the points of the set of points, and digitally designing the support including at least an imprint of the fibrous blank having the shape of the generated web.

4 Claims, 7 Drawing Sheets

(51) Int. Cl.
*B29C 70/48* (2006.01)
*B29D 99/00* (2010.01)
*F01D 5/14* (2006.01)
*G05B 19/4099* (2006.01)
*G05B 19/41* (2006.01)
*G06F 30/00* (2020.01)

(56) References Cited

U.S. PATENT DOCUMENTS

| | | |
|---|---|---|
| 9,080,454 B2 | 7/2015 | Coupe et al. |
| 2012/0055609 A1* | 3/2012 | Blanchard ............... B29C 70/24 |
| | | 156/92 |
| 2016/0082660 A1 | 3/2016 | Schuster et al. |
| 2021/0292245 A1* | 9/2021 | Bouillon ............... C04B 35/563 |
| 2022/0274354 A1* | 9/2022 | Tesson ................... B29C 70/24 |

OTHER PUBLICATIONS

Velasco, Jr., V. B., et al., "Computer-Assisted Gripper and Fixture Customization Using Rapid-Prototyping Technology," Proceedings of the 1998 IEEE International Conference on Robotics & Automation, May 1998, vol. 4, XP010281414, pp. 3658-3664.
Amenta, N., et al., "Surface Reconstruction by Voronoi Filtering", Discrete and Computational Geometry, pp. 39-48, (Year: 1999).
Berger, M., et al., "State of the Art in Surface Reconstruction from Point Clouds", Eurographics—State of the Art Reports, 26 pages, (Year: 2014).

\* cited by examiner

[Fig. 1]
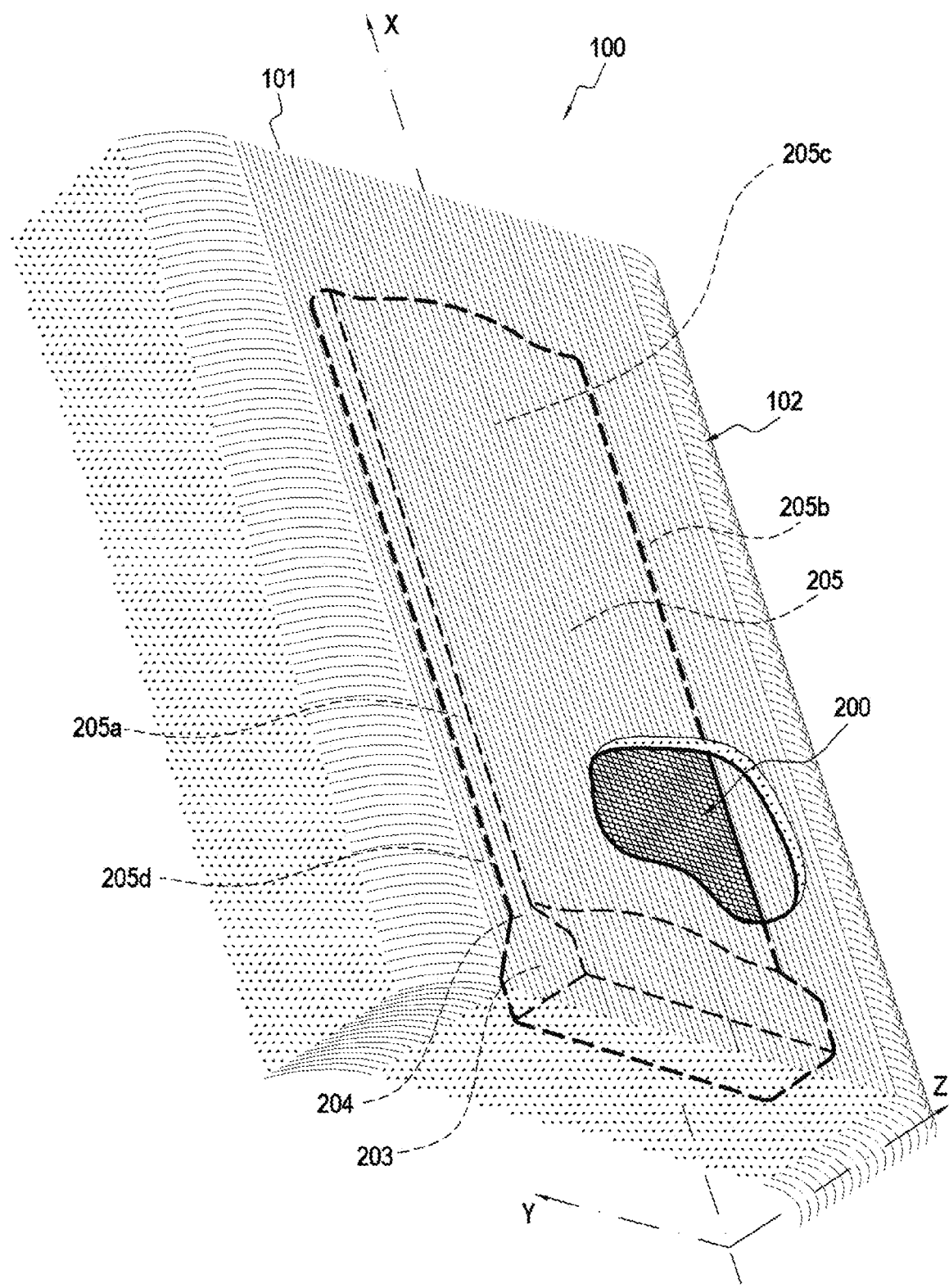

[Fig.2]
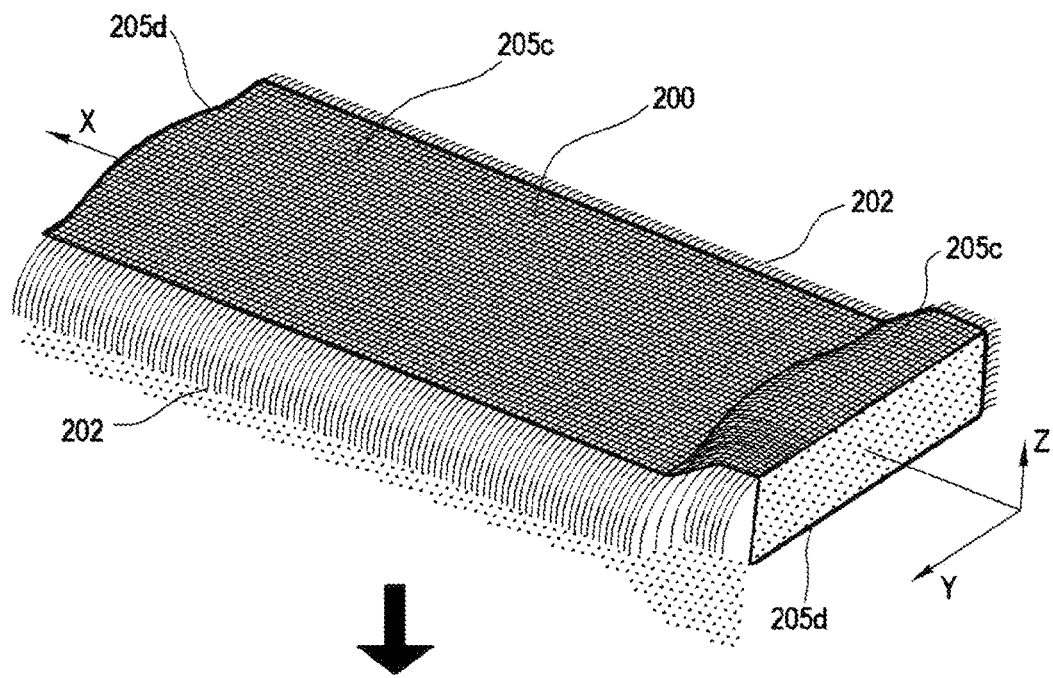
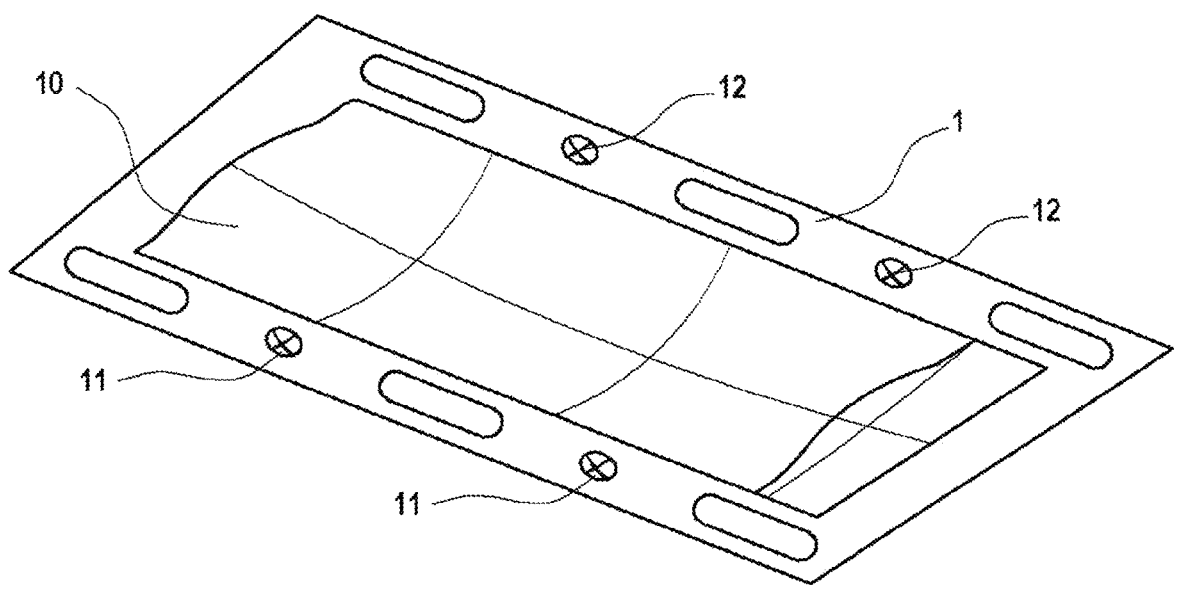

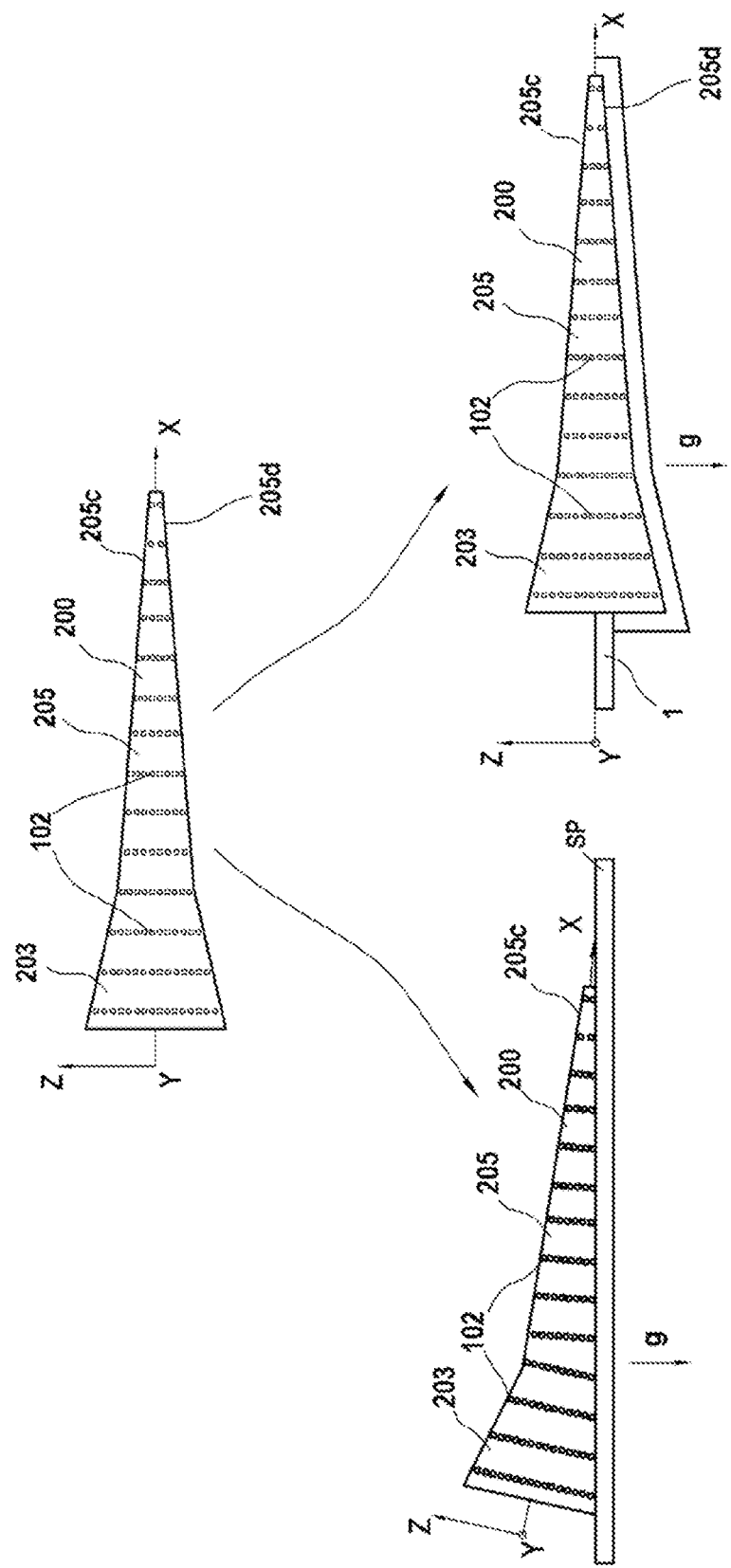
[Fig. 3]

[Fig.4]
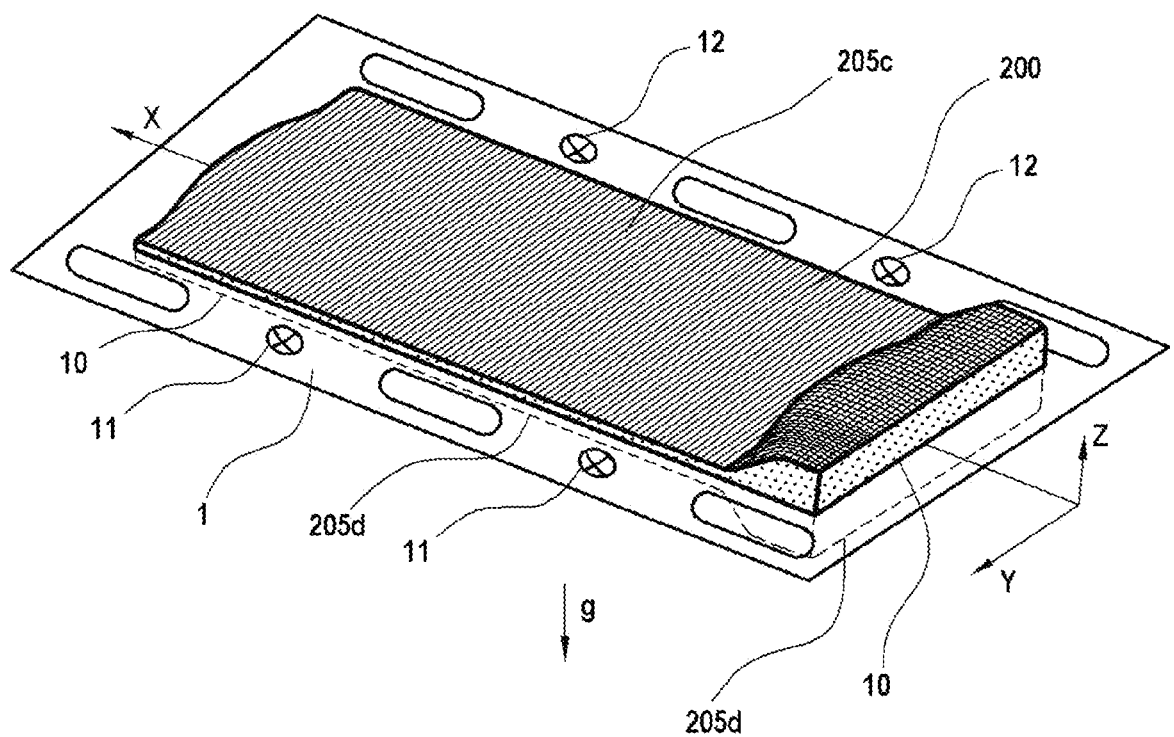

[Fig.5]
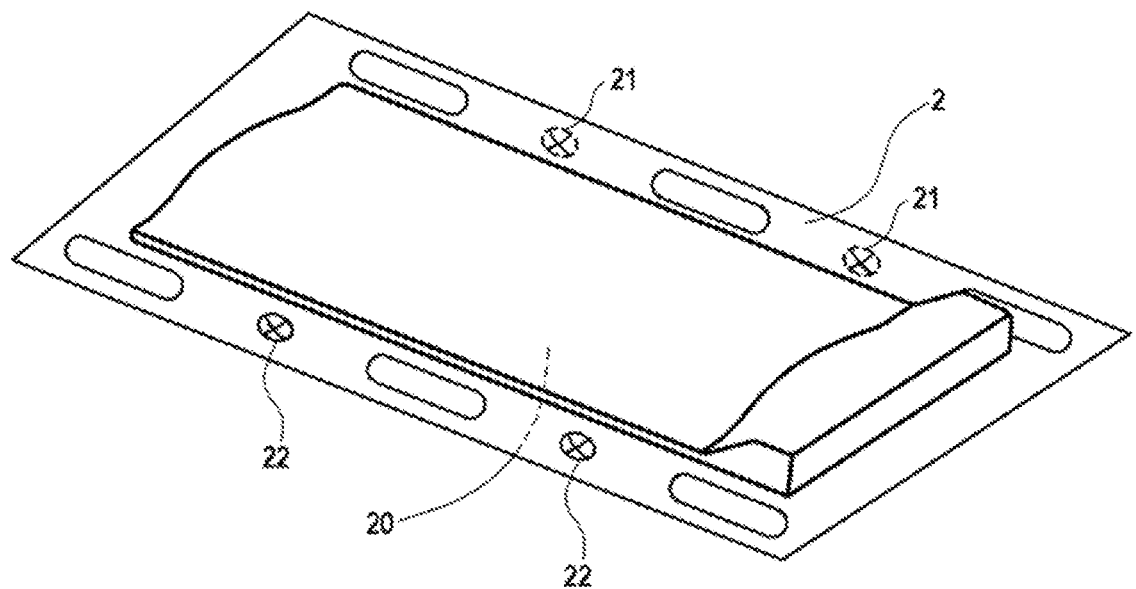
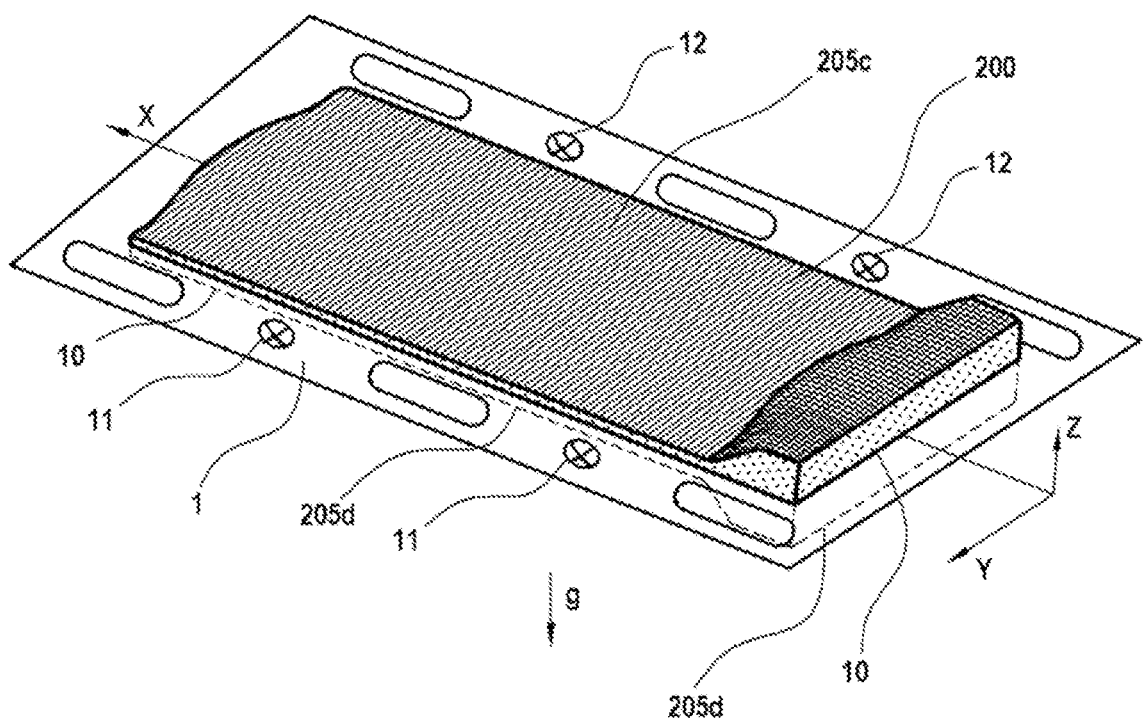

[Fig.6]
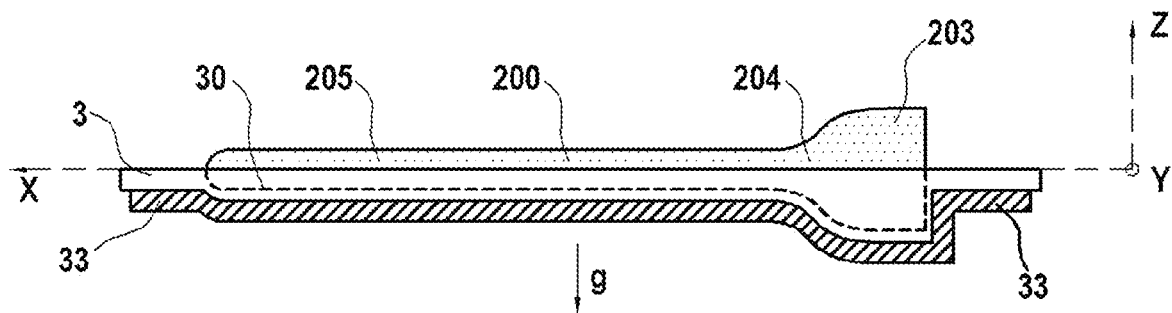
[Fig.7]
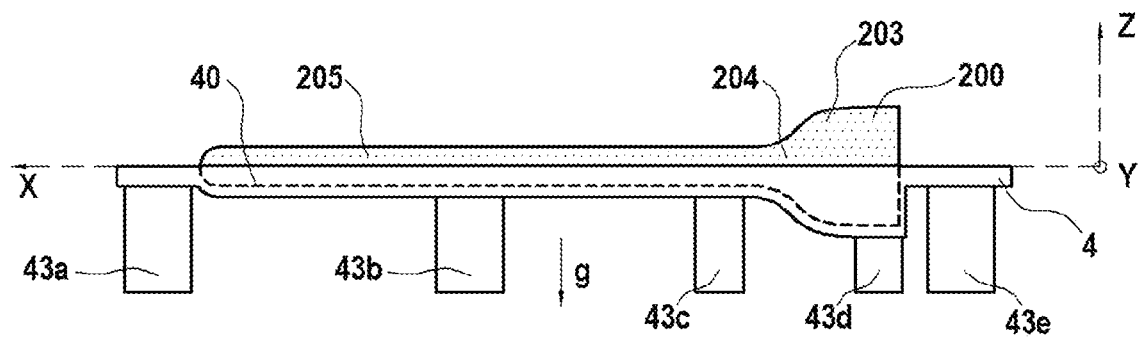

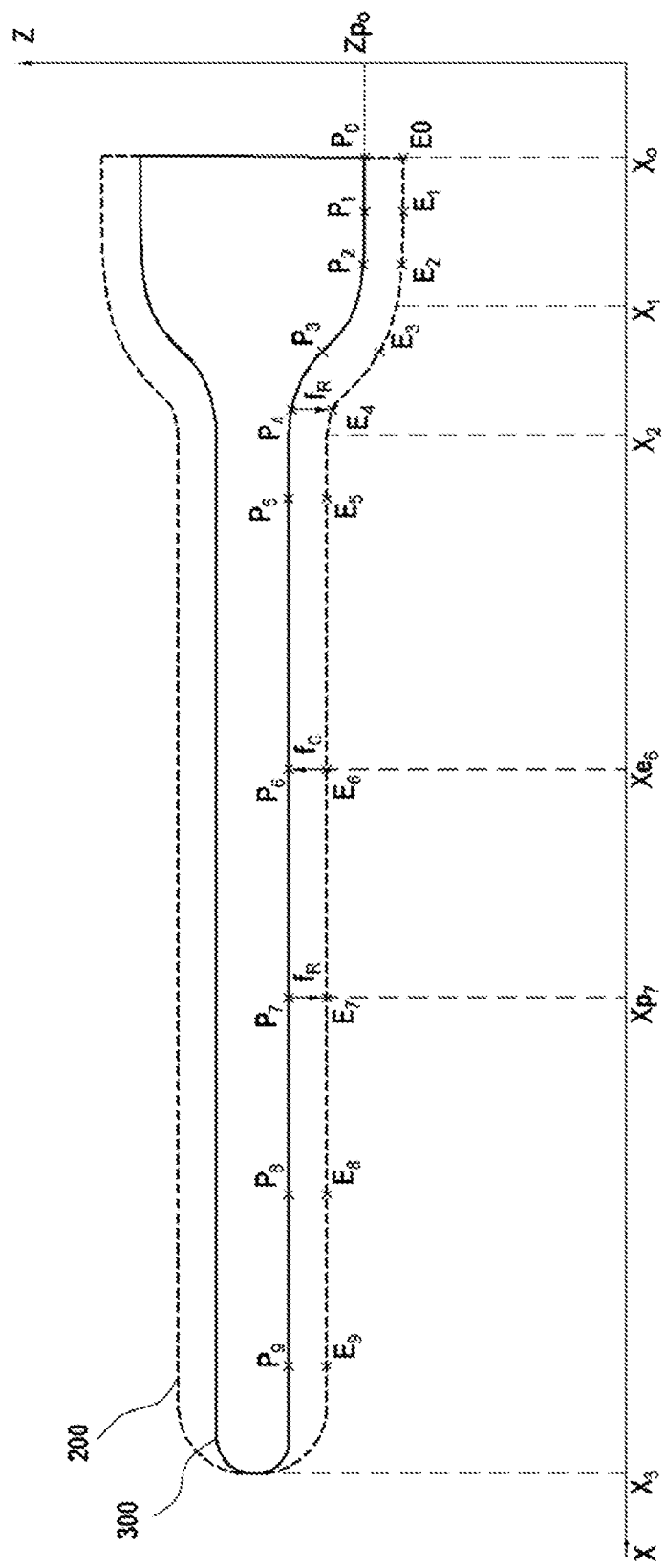
[Fig. 8]

SUPPORT FOR A FIBROUS BLADE OR PROPELLER BLANK

CROSS-REFERENCE TO RELATED APPLICATIONS

This application claims priority to French Patent Application No. 2107391, filed Jul. 8, 2021, the entire content of which is incorporated herein by reference in its entirety.

FIELD

The invention relates to the manufacture of blades or propellers made from composite material comprising a fibrous reinforcement produced by three-dimensional weaving and densified by a matrix.

BACKGROUND

Using composite materials to manufacture blades or propellers, for example for the blades of a gas turbine for an aircraft engine or for an industrial turbine, makes it possible to obtain parts that offer mechanical performances that match or are even better than those made from metal, while weighing considerably less.

The manufacture of these blades and propellers may begin by producing a one-piece fibrous blank by three-dimensional weaving, which will then be compacted and shaped in such a way as to obtain a fibrous preform of the blade or propeller to be manufactured. The fibrous preform is then densified by a matrix in order to obtain the part. An example of a method for manufacturing a blade or a propeller made from composite material is described, for example, in document FR3046564 or in document FR3046563.

However, further improvements to the mechanical performances of blades and propellers made from composite material obtained by this type of method remain desirable.

SUMMARY

It has been observed that blades or propellers produced using the abovementioned type of method may be rejected. Indeed, poor mechanical characteristics have been observed, in particular relating to fatigue behavior, especially at the junction between the root and the aerodynamic profile. Tomography of the blades has revealed anomalies in the orientation of the weft columns of the fibrous reinforcement.

An aspect of the present invention is to propose a solution making it possible to obtain blades or propellers made from composite material comprising a fibrous reinforcement in which the weft columns are oriented correctly, in order to obtain improved mechanical characteristics, in particular as regards fatigue behavior.

To this end, an aspect of the invention proposes a method for digitally designing a support with the shape of a fibrous blank obtained by three-dimensional weaving intended to form a fibrous preform of a turbine engine blade or propeller after shaping and compaction in a mold, comprising at least:
  providing a set of points representative of a face of the fibrous blank, the face being intended to form the root of the blade or the propeller and a portion of an aerodynamic profile of the blade or the propeller,
  generating a web connecting the points of said set of points, and
  digitally designing the support comprising at least an imprint of the fibrous blank having the shape of the generated web.

Indeed, it has been established that the anomalies in the orientation of the weft columns were due to the transportation and handling of the fibrous blank before it underwent compaction and shaping, the fibrous blank being arranged on a flat surface. Owing to the variations in thickness of the fibrous blank, arranging it on a flat surface causes the fibers to become deformed, in particular under the effect of gravity. By using a support whose shape matches the surface of the blank that is to be transported, these deformations are avoided and the mechanical properties of the resulting parts are improved.

According to an aspect of the invention, providing the set of points comprises at least:
  providing a set of initial points representative of a face of the fibrous preform forming the root and a portion of the aerodynamic profile of the blade or the propeller, and
  transforming the set of initial points into the set of points by applying a transformation function corresponding to the reciprocal function of the function corresponding to the shaping and compaction of the fibrous blank into a fibrous preform in the mold.

According to a particular aspect of the invention, the transformation function comprises at least one function corresponding to the compaction of the fibrous blank into a fibrous preform in the mold, the function corresponding to the compaction associating, with the dimension of a point of the non-compacted blank, a dimension of a point of the compacted blank, by multiplying the dimension of the point of the non-compacted blank by a compaction factor such that:
  if the point of the blank belongs to the portion intended to form the root of the blade or the propeller, the value of the compaction factor is between 83% and 100%;
  if the point of the blank belongs to the portion intended to form the transition between the root and the aerodynamic profile of the blade or the propeller, the value of the compaction factor is between 50% and 84%;
  if the point of the blank belongs to the portion intended to form the aerodynamic profile of the blade or the propeller, the value of the compaction factor is between 62% and 84%;

According to another aspect of the invention, digitally designing the support further comprises determining the rigidity of the support to be designed depending on the weight of the blank so that the imprint of the support is not deformed under the weight of the blank.

This additional step of calculating the deformations of the support under the weight of the blank helps further reduce the risk of deforming the fibers of the fibrous blank during storage or transportation, by limiting the deformation of the support under the weight of the blank.

According to another particular aspect of the invention, determining the rigidity of the support comprises designing at least one stiffener of the support.

An aspect of the invention further relates to a method for manufacturing a support with the shape of a fibrous blank obtained by three-dimensional weaving intended to form a fibrous preform of a turbine engine blade or propeller after shaping and compaction in a mold, comprising at least the implementation of the digital design method according to an aspect of the invention in order to design the support, and the manufacturing of the support designed in this way.

An aspect of the invention further relates to a method for manufacturing a fibrous preform of a turbine engine blade or propeller comprising the following steps:
  producing a fibrous blank by three-dimensional weaving, positioning the fibrous blank in a support manufactured by the manufacturing method according to the invention, transporting the fibrous blank in the support to the mold and placing the fibrous blank in the mold, and shaping and compacting the fibrous blank placed in the mold in such a way as to obtain the fibrous preform.

An aspect of the invention further relates to a device for digitally designing a support with the shape of a fibrous blank obtained by three-dimensional weaving intended to form a fibrous preform of a turbine engine blade or propeller after shaping and compaction in a mold, comprising at least:

a module for providing a set of points representative of a face of the fibrous blank, said face being intended to form the root of the blade or the propeller and a portion of an aerodynamic profile of the blade or the propeller, a module for generating a web capable of generating a web by connecting the points of said set of points, and a module for digitally designing the support suitable for digitally designing at least an imprint of the fibrous blank having the shape of the web capable of being generated by the module for generating the web.

According to a particular aspect of the invention, the providing module is capable of:

providing a set of initial points representative of a face of the fibrous preform forming the root and a portion of the aerodynamic profile of the blade or the propeller, and transforming the set of initial points into the set of points by applying a transformation function corresponding to the reciprocal function of the function corresponding to the shaping and compaction of the fibrous blank into a fibrous preform in the mold.

According to another particular aspect of the invention, the digital design device 5 further comprises a calculation module capable of determining the rigidity of the support to be designed depending on the weight of the blank so that the imprint of the support is not deformed under the weight of the blank.

BRIEF DESCRIPTION OF THE DRAWINGS

FIG. 1 is a schematic perspective view of a fibrous pre-blank produced by three-dimensional weaving intended for producing a fibrous preform.

FIG. 2 is an exploded schematic perspective view showing the placing of an untrimmed fibrous blank, obtained from the pre-blank of FIG. 1, in a support according to the invention.

FIG. 3 is a simplified comparative diagram showing a fibrous blank arranged on a flat support and a fibrous blank arranged on a support according to the invention.

FIG. 4 is a schematic perspective view showing the placing of a fibrous blank, obtained by trimming the untrimmed fibrous blank of FIG. 2, in a support according to the invention.

FIG. 5 is an exploded schematic perspective view showing the placing of the fibrous blank of FIG. 4 between two supports according to the invention.

FIG. 6 is a schematic cross-section view of a support provided with longitudinal stiffeners according to one embodiment of the invention.

FIG. 7 is a schematic cross-section view of a support provided with vertical stiffeners according to one embodiment of the invention.

FIG. 8 is a schematic representation of the relationship between two point clouds representing a face of the fibrous blank and the corresponding face of the fibrous preform obtained after compacting said fibrous blank.

DETAILED DESCRIPTION

An aspect of the invention applies generally to the production of blades or propellers made from composite material for turbine engines, the blade comprising a fibrous reinforcement densified by a matrix.

The method for manufacturing a blade made from composite material begins by producing a fibrous blank obtained by three-dimensional weaving or by multilayer weaving.

"Three-dimensional weaving" or "3D weaving" should be understood in this instance to mean a weaving method in which at least some of the warp threads bind weft threads over several weft layers, for example in the manner of an "interlock weave".

"Interlock weave" should be understood in this instance to mean a 3D weave in which each warp layer binds several weft layers with all the threads of a given warp column having the same movement in the plane of the weave. It should be noted that, in general, the roles of the warp and weft threads are interchangeable.

"Multilayer weave" should be understood in this instance to mean a three-dimensional weave with several weft layers in which the basic weave of each layer is equivalent to a conventional 2D fabric weave, such as a plain, satin or twill weave, but with some points in the weave that bind the weft layers together.

Producing the fibrous blank by 3D weaving makes it possible to obtain a bond between the layers, and thus to provide the fibrous blank, and therefore the blade made from composite material, with good mechanical strength, in a single textile operation.

An embodiment of a fibrous blank is now described. In this example, the weaving is carried out on a Jacquard loom.

FIG. 1 shows, schematically, the weaving of a fibrous pre-blank 100 from which a fibrous blank 200 (FIG. 2) can be extracted that makes it possible, after compaction and shaping, to obtain a fibrous reinforcement preform of an aircraft engine blade.

The fibrous pre-blank 100 is obtained by three-dimensional weaving, or 3D weaving, or by multilayer weaving carried out in a known manner using a Jacquard weaving loom on which a bundle of warp threads or strands 101 has been arranged in a plurality of layers, the warp threads being bound by weft layers 102 that are also arranged in a plurality of layers. A detailed embodiment of a fibrous preform intended to form the fibrous reinforcement of an aircraft engine blade from a 3D woven fibrous blank is described in detail in particular in documents U.S. Pat. Nos. 7,101,154, 7,241,112 and WO 2010/061140.

The fibrous pre-blank 100 is woven in the form of a strip extending generally in a direction X corresponding to the longitudinal direction of the blade to be produced. The fibrous pre-blank 100 extends transversely in a direction Y, and thickness-wise in a direction Z perpendicular to the directions X and Y.

In the fibrous pre-blank 100, the fibrous blank 200 has a variable thickness determined depending on the longitudinal thickness and profile of the vane of the blade to be produced. In its portion intended to form a root preform, the fibrous blank 200 has a thickened portion 203 determined depending on the thickness of the root of the blade to be produced. The fibrous blank 200 extends with a portion of decreasing thickness 204 intended to form the blade support and then with a portion 205 intended to form the vane of the blade.

In the direction Y, the portion 205 has a profile of variable thickness between its edge 205a intended to form the leading edge of the blade and its edge 205b intended to form the trailing edge of the blade to be produced. The portion 205 extends in the direction Z between a first face 205c intended to form the lower surface of the profile of the blade and a second face 205d intended to form the upper surface of the profile of the blade.

The fibrous blank 200 is woven in a single piece. In the portions of the fibrous blank that have variations in thickness, for example in the portion of decreasing thickness 204, the thickness of the blank is reduced by gradually withdrawing weft layers during weaving. Once the weaving of the blank 200 in the pre-blank 100 is complete, the superfluous non-woven threads in the direction Z are cut. The blank 200 shown in FIG. 2 and woven in a single piece is thus obtained, still having superfluous non-woven threads in the longitudinal direction X and transverse direction Y of the blade.

In the example shown in FIG. 2, the blank 200 having superfluous non-woven threads 202 in the directions X and Y is arranged on a support 1 designed according to the method of an aspect of the invention, having an imprint 10 with the dimensions of the surface of the blank 200. Therefore, the blank 200 is arranged on the support in such a way that the face 205d of the blank 200 intended to form the upper surface of the profile of the blade is placed in contact with the support 1. The directions X and Y of the blank 200 are horizontal, the direction Z of the blank 200 corresponding, at all points of the blank 200, to the direction of the gravity field. The blank 200 is therefore supported at all points by the support 1, and does not undergo deformation resulting from gravity. The superfluous non-woven threads 202 in the directions X and Y of the blank 200 are arranged outside the imprint 10.

Naturally, if it is the face 205c of the blank 200 intended to form the lower surface of the profile of the blade that is placed in contact with the support, this not beyond the scope of the invention.

FIG. 3 shows the fibrous blank 200 in diagram form when it is arranged on a flat support SP and when it is arranged on the support 1 according to an aspect of the invention.

When the fibrous blank 200 is arranged on the flat support SP, the fibrous blank 200 is deformed under its own weight, particularly in the portion situated between the portion 203 intended to form the blade root and the portion 205 intended to form the blade vane. Thus, the weft columns 102 display orientation anomalies and the direction X representing the longitudinal direction of the blank is deformed. These defects can adversely affect the mechanical characteristics of the blade manufactured from the fibrous blank, in particular as regards its fatigue behavior.

However, when the fibrous blank is arranged on the support 1 according to an aspect of the invention, the fibrous blank 200 is supported at all points by the support. Therefore, the weft columns are not deformed under the weight of the blank and the direction X representing the longitudinal direction of the blank is perpendicular at all points to the acceleration of gravity g.

The design and manufacture of said support are described later in the description.

Next, the superfluous non-woven threads 202 are cut off. The blank 200 shown in FIG. 4 and woven in a single piece is thus obtained, no longer having any non-woven threads.

In the example described above, the fibrous blank 200 does not have non-interlinked zones. However, the fibrous blank 200 may comprise non-interlinked zones, for example in order to allow a shaping part to be inserted, without going beyond the scope of the invention.

The support 1 allows the blank 200 to be inspected without undergoing deformation due to gravity g. The first face 205c of the blank 200 can therefore be inspected easily.

In the case of a blank that is symmetrical in the direction X, the support allows both faces 205c and 205d of the blank to be inspected, by turning the blank over in such a way as to place the first face 205c in contact with the imprint 10 of the support. The second face 205d is thus exposed, while ensuring the blank 200 is supported against gravity g.

Two supports according to an embodiment of the invention may be used in order to turn the blank over. The first support 1 will have an imprint in the shape of the face of the blank intended to form the upper surface of the profile of the blade, whereas the second support aura an imprint in the shape of the face of the blank intended to form the lower surface of the profile of the blade.

As shown in FIGS. 4 and 5, the fibrous blank 200 is arranged in the first support 1 such that the second face 205d of the blank 200 is in contact with the imprint 10 of first support 1. The second support 2 is placed on the blank 200 such that the first face 205c of the blank 200 is in contact with the imprint 20 of the second support 2.

The supports 1 and 2 are then held against the blank 200 in order to allow it to be turned over. The positions of the first and second supports 1 and 2 are inverted at the end of the turn-over operation. The first support 1, situated above the fibrous blank 200 and the second support 2, is then removed in order to expose the second face 205d of the blank 200, for example in the context of an inspection.

Naturally, if it is the first face 205c of the blank 200 intended to form the lower surface of the profile of the blade that is placed in contact with the first support 1, this not beyond the scope of the invention.

The supports may be held against each other during the turn-over operation by means of a fastening system used to link them together. The first support and the second support may be in contact with each other during the turn-over operation.

If the supports are in contact with each other during the turn-over operation, the supports may be provided with a positioning system. The positioning example shown in FIG. 5 comprises protrusions 11 and 21, for example in the form of half-spheres, and recesses 12 and 22 suitable for cooperating with the protrusions 11 and 21 on each of the supports 1 and 2. Each protrusion 11 and 21 on one of the two supports is inserted into one of the recesses 12 and 22 of the other support when they are placed against each other for the turn-over operation.

In the case of a blank that is symmetrical in the direction X, the blank can be turned over using two identical supports according to an aspect of the invention. The two identical supports may have a positioning system. In the example shown in FIG. 5, the supports 1 and 2 are identical, and the protrusions 11 and 21 and recesses 12 and 22 are arranged at the same locations on the first support 1 and on the second support 2.

The woven and possibly inspected fibrous blank, as described above, is intended to be compacted and shaped in order to form a fibrous preform that is ready to be densified.

In order to move the fibrous blank from the location where it has been woven and/or inspected to a storage location or to the mold where it shall be compacted and shaped, the support 1 or 2 is used to support the blank.

The support 1 or 2 is thus used to transport the blank 200 such that the directions X and Y of the blank are horizontal, the direction Z of the blank 200 corresponding at all points of the blank to the direction the gravity field g. The blank 200 is therefore supported by the support 1 or 2 at all points when it is being transported, and does not undergo deformation as a result of gravity g.

The support may be provided with stiffeners to improve the support it provides to the blank. The stiffeners are present on the surface opposite the imprint of the support. For example, FIG. 6 shows a schematic cross-section of a support 3 equipped with one or several stiffeners 33 supporting the fibrous blank 200. This stiffener 33 helps ensure the rigidity of the support and limit its deformation under the effect of the weight of the blank.

The stiffener 33 may be made from the same material as the rest of the support, for example from thermoplastic material.

In the example shown in FIG. 6, the stiffener 33 is in the form of a wall that extends along the length of the support in the longitudinal direction X of the fibrous blank 200, locally forming a thickened portion in the support in the direction Z. The fibrous blank 200 is therefore supported along its entire length.

According to another embodiment, the stiffeners may extend in the direction Z, or indeed Y, of the blank 200. For example, FIG. 7 shows a schematic cross-section of a support 4 equipped with stiffeners 43a, 43b, 34c, 43d and 43e supporting the fibrous blank 200. These stiffeners 43a, 43b, 43c, 43d and 43e help ensure the rigidity of the support and limit its deformation under the effect of the weight of the blank.

The stiffeners 43a, 43b, 43c, 43d and 43e may be made from the same material as the rest of the support, for example from thermoplastic material.

In the example shown in FIG. 7, particular support has been provided for the thickened portion 203 intended to form the root of the blade and the portion 205 intended to form the vane of the blade. The portion 204 that provides the transition between the two other portions 203 and 205 is also little affected by gravity because of the proximity of the stiffener 43d supporting the portion 203 intended to form the root of the blade and the stiffener 43c supporting the portion 205 intended to form the vane of the blade.

The number, location and characteristics of the stiffeners to be added under the support are determined during a step of calculating the deformations of the support that is set out later in the description.

Using stiffeners is not essential. Indeed, a material that is sufficiently rigid may be chosen to produce the support in order to achieve sufficient rigidity to support the blank.

According to a beneficial property of the type of stiffener used, the stiffeners may absorb vibrations, to a certain extent, for example vibrations that occur when transporting the support on a trolley. The stiffeners then have a damping function, for example comprising springs.

After transporting the fibrous blank to the compaction and shaping mold, applying a compaction pressure both allows the fibrous blank to be compacted by a determined compaction rate in order to obtain a fiber content that is also determined, and allows the fibrous blank to be shaped according to the profile of the blade to be manufactured.

The compaction rate varies depending on the zones of the blade to be manufactured.

The portions intended to form the blade root are compacted by 0% to 17% in the direction Z of the thickness of the blank laid flat, i.e., the thickness of the compacted fibrous preform laid flat corresponds to between 83% and 100% of the thickness of the fibrous blank.

The portions intended to form the transition between the blade root and the blade vane are compacted by 16% to 50% in the direction Z of the thickness of the blank laid flat, i.e., the thickness of the compacted fibrous preform laid flat corresponds to between 50% and 84% of the thickness of the fibrous blank.

The portions intended to form the blade vane are compacted by 16% to 38%, i.e., the thickness of the compacted fibrous preform laid flat corresponds to between 62% and 84% of the thickness of the fibrous blank.

Moreover, shaping by twisting may also be applied in the mold to the portions intended to form the blade vane or to form the transition between the blade vane and the blade root.

The compaction and shaping values are defined by the function $f_{CM}$, which corresponds to the shaping and compaction of the fibrous blank into a fibrous preform. It can be broken down into a function $f_C$, which corresponds only to the compaction of the blank, and a function $f_M$, which corresponds to other possible shaping operations, such as twisting, for example.

The fibrous blank may be placed on a lifting and transportation tool before being placed in the compaction and shaping mold. Such a lifting and transportation tool is described in document FR3046564B1, for example.

The fibrous blank may also be arranged in a holding and shaping tool that will itself be arranged in the compaction and shaping tool, in order to obtain a preform in the shape of the blade to be produced. The holding and shaping tool is then used to protect the preform while it is being transported to the injection tool, for example a resin transfer molding (RTM) tool. Such a holding and shaping tool is described in document FR3046563B1, for example.

After shaping and compaction, the preform is, for example, positioned in an injection-molding tool, with or without an additional holding tool.

The preform is then impregnated with a thermosetting resin that is polymerized by heat treatment. The well-known RTM (resin transfer molding) process is used for this purpose. According to the RTM process, a resin, for example a thermosetting resin, is injected through an injection port into the internal space occupied by the preform. This configuration allows a pressure gradient to be established between the lower portion of the preform where the resin is injected and the upper portion of the preform situated close to the discharge port. In this way, the resin injected substantially at the lower portion of the preform gradually impregnates the whole of the preform by flowing through it up to the discharge port, through which the surplus is discharged. Naturally, the injection molding tool may comprise several injection ports and several discharge ports.

The resins suitable for RTM processes are well known. They desirably have low viscosity in order to facilitate their injection into the fibers. The choice of temperature class and/or the chemical nature of the resin is determined depending on the thermomechanical stresses to which the part will be subjected. Once the resin has been injected into the whole of the reinforcement, it is polymerized by heat treatment in accordance with the RTM process.

After injection and polymerization, the blade is demolded. It may optionally undergo a post-curing cycle to improve its thermomechanical characteristics. Finally, the blade is trimmed to remove the excess resin and the chamfers are machined. No other machining operation is necessary because, since the part is molded, it matches the required dimensions. A blade formed from a fibrous reinforcement densified by a matrix is thus obtained.

An example of the design and manufacture of a support according to an aspect of the invention will now be described.

A coordinate system denoted (X, Y, Z) is defined. As shown in FIG. 8, the axis X corresponds to the longitudinal direction of the blade to be produced laid flat, the axis Y corresponds to the transverse direction of the blade to be produced laid flat and the axis Z corresponds to the thickness direction of the blade to be produced laid flat. The profile of the fibrous blank 200 is shown, along with the profile of the fibrous preform 300. The dimensions of the fibrous blank 200 in the direction Z are deliberately increased to ensure the diagram is clear.

A set of points ($E_i$) with coordinates ($Xe_i$, $Ye_i$, $Ze_i$) in space (X, Y, Z) representative of a face of the fibrous blank 200, said face being intended to form the root of the blade and one of the lower surface or the upper surface of the blade, is first provided. An example with a reduced number of points ($E_i$) is shown in FIG. 8.

The axis X is divided into several regions, each associated with a particular zone of the blade to be obtained.

The points ($E_i$) belonging to the portion intended to form the blade root are such that their X-axis value $Xe_i$ is between $X_0$ and $X_1$.

The points ($E_i$) belonging to the portion intended to form the transition between the blade root and the blade vane are such that their X-axis value $Xe_i$ is between $X_1$ and $X_2$.

The points ($E_i$) belonging to the portion intended to form the blade vane are such that their X-axis value $Xe_i$ is between $X_2$ and $X_3$.

According to one embodiment of the invention, this set of points ($E_i$) with coordinates ($Xe_i$, $Ye_i$, $Ze_i$) can be obtained from specification files of the shaped and compacted preform 300. These specification files may, for example, have been obtained from a 3D model produced by CAD (computer-aided design).

These specification files of the shaped and compacted preform 300 comprise a set of points ($P_i$) with coordinates ($Xp_i$, $Yp_i$, $Zp_i$). This set of points is representative of a face of the flattened fibrous preform 300 obtained after compaction and shaping, this face being intended to form the root of the blade and one of the lower surface or the upper surface of the blade. An example with a reduced number of points ($P_i$) is shown in FIG. 8.

The points ($P_i$) belonging to the portion intended to form the blade root are such that their X-axis value $Xp_i$ is between $X_0$ and $X_1$.

The points ($P_i$) belonging to the portion intended to form the transition between the blade root and the blade vane are such that their X-axis value $Xp_i$ is between $X_1$ and $X_2$.

The points ($P_i$) belonging to the portion intended to form the blade vane are such that their X-axis value $Xp_i$ is between $X_2$ and $X_3$.

In order to calculate the coordinates of the points ($E_i$) representative of the face of the fibrous blank 200 from the coordinates of the points ($P_i$) representative of the face of the fibrous preform 300, the compaction and shaping need to be taken into account.

The function $f_{CM}$ corresponds to the shaping and compaction of the fibrous blank into a fibrous preform, such that $(P_i)=f_{CM}(E_i)=f_M(f_c(E_i))$. The function $f_c$ corresponds to the compaction of the fibrous blank. The function $f_M$ corresponds to other shaping operations carried out on the fibrous blank, such as twisting carried out in the mold.

In the interest of clarity, the example shown in FIG. 8 concerns a fibrous blank 200 that is compacted into a fibrous preform 300 without any other shaping operations, i.e., the fibrous blank does not undergo twisting, for example. Therefore, in the example shown in FIG. 8, the function $f_M$ corresponding to other shaping operations carried out on the fibrous blank is the identity function, and therefore $(P_i)=f_{CM}(E_i)=f_c(E_i)$.

In order to define the function $f_c$ corresponding to the compaction of the fibrous blank 200, there are values $FC_{01}$, $FC_{12}$ and $FC_{23}$ referred to as the compaction factor and values $FF_{01}$, $FF_{12}$ and $FF_{23}$ referred to as the expansion factor, which depend on the zone in question of the fibrous blank. In a given zone of the fibrous blank, the expansion factor quantifies the local thickening of the blank before it is compacted to its final thickness. This local thickening before compaction is equal to the product of the local expansion factor and the local thickness obtained after compaction. The table below describes the application of the function $f_c$ to the dimension $Ze_i$ in order to obtain the dimension $Zp_i$, for each point according to its X-axis value $Xe_i$, and the value of the compaction factor and the expansion factor to be adopted.

TABLE 1

| $Xe_i$ | $X0 \leq Xe_i \leq X_1$ | $X_1 \leq Xe_i \leq X_2$ | $X_2 \leq Xe_i \leq X_3$ |
|---|---|---|---|
| $Zp_i = f_c(Ze_i)$ | $Zp_i = FC_{01} \times Ze_i$ | $Zp_i = FC_{12} \times Ze_i$ | $Zp_i = FC_{23} \times Ze_i$ |
| FC(FF) | $FC_{01} = \dfrac{1}{FF_{01}+1}$ | $FC_{12} = \dfrac{1}{FF_{12}+1}$ | $FC_{23} = \dfrac{1}{FF_{23}+1}$ |
| FF | $0\% \leq FF_{01} < 20\%$ | $20\% \leq FF_{12} \leq 100\%$ | $20\% \leq FF_{23} \leq 60\%$ |
| FC | $83.3\% \leq FC_{01} \leq 100\%$ | $50\% \leq FC_{12} \leq 83.3\%$ | $62.5\% \leq FC_{23} \leq 83.3\%$ |

In order to calculate the coordinates of the points ($E_i$) representative of the face of the fibrous blank from the coordinates of the points ($P_i$) representative of the face of the fibrous preform, the reciprocal function $f_R$ of the function $f_c$ corresponding to the compaction of the fibrous blank into a fibrous preform is used, such that $(E_i)=f_R(P_i)$. The values $FC_{01}$, $FC_{12}$ and $FC_{23}$ referred to as the compaction factor and the values $FF_{01}$, $FF_{12}$ and $FF_{23}$ referred to as the expansion factor are retrieved, which depend on the zone in question of the fibrous preform. The table below describes the application of the function $f_R$ to the dimension $Zp_i$ in order to obtain the dimension $Ze_i$, for each point according to its X-axis value $Xp_i$, and the value of the expansion factor to be adopted.

TABLE 2

| $Xp_i$ | $X_0 \leq Xp_i \leq X_1$ | $X_1 \leq Xp_i \leq X_2$ | $X_2 \leq Xp_i \leq X_3$ |
|---|---|---|---|
| $Ze_i = f_R(Zp_i)$ | $Ze_i = (FF_{01}+1) \times Zp_i$ | $Ze_i = (FF_{12}+1) \times Zp_i$ | $Ze_i = (FF_{23}+1) \times Zp_i$ |
| FF | $0\% \leq FF_{01} \leq 20\%$ | $20\% \leq FF_{12} \leq 100\%$ | $20\% \leq FF_{23} \leq 60\%$ |

The coordinates of the points ($E_i$) representative of the face of the fibrous blank can thus be calculated from the coordinates of the points ($P_i$) representative of the face of the fibrous preform.

Next, a surface comprising all the previously obtained points ($E_i$) is constructed. The methods for constructing and smoothing a surface from a point cloud are known per se.

The document titled "Surface reconstruction by Voronoi filtering", *Discrete and Computational Geometry* (1999), by N. Amenta et al. proposes, in particular, the method referred to as the "crust" method, based on Delaunay triangulations, in order to obtain a surface from a sample of points. The document titled "State of the Art in Surface Reconstruction from Point Clouds", *Eurographics—State of the Art Reports*

(2014) by M. Berger et al. proposes an overview of methods that can be applied to surface reconstruction. The methods described in these publications can be used in the context of the invention.

A digital surface is thus obtained representing a face of the fibrous blank, said face being intended to form the root of the blade and one of the lower surface or the upper surface of the blade. A support is constructed digitally for the fibrous blank based on this digital surface, comprising an imprint in the form of the previously obtained digital surface.

According to an embodiment of the invention, a step of calculating the deformations of the digital support under the weight of the fibrous blank can also be carried out. This calculation step may be carried out using the finite element method, which is a method that is known per se.

This step of calculating the deformations may make it possible to optimize the thickness of the support in order to reduce its overall weight. Indeed, a lightweight support particularly facilitates transportation and operations for turning over the fibrous blank.

Calculating the deformations may also help evaluate whether or not stiffeners are required under the support. If necessary, this calculation step can help determine the number, location and characteristics of the stiffeners to be added under the support.

In an embodiment, a device for digitally designing a support with the shape of a fibrous blank obtained by three-dimensional weaving intended to form a fibrous preform of a turbine engine blade or propeller after shaping and compaction in a mold, includes a first module for providing a set of points representative of a face of the fibrous blank, the face being intended to form the root of the blade or the propeller and a portion of an aerodynamic profile of the blade or the propeller, a second module for generating a web capable of generating a web by connecting the points of the set of points, and a third module for digitally designing the support suitable for digitally designing at least an imprint of the fibrous blank having the shape of the web capable of being generated by the module for generating the web. The device includes circuitry or electronic circuits for implementing the first, second and third modules and their respective functions. The circuitry or electronic circuits may include one or more non-transitory memories for storing machine executable instructions and a processor for executing the machine executable instructions so as to carry out the functions of each of the first, second and third modules. The device may also include one or more graphical interfaces, a display and a user input (e.g. a keyboard) for inputting data or parameters for digitally designing the support. According to a particular aspect of the invention, the providing or first module is capable of providing a set of initial points representative of a face of the fibrous preform forming the root and a portion of the aerodynamic profile of the blade or the propeller, and transforming the set of initial points into the set of points by applying a transformation function corresponding to the reciprocal function of the function corresponding to the shaping and compaction of the fibrous blank into a fibrous preform in the mold. Specific machine executable instructions for carrying these functions of the providing or first module can be stored in the one or more non-transitory memories. These specific machine executable instructions are then executed by the processor to carry out these steps or functions of the first or providing module.

According to another particular aspect of the invention, the digital design device further comprises a calculation module capable of determining the rigidity of the support to be designed depending on the weight of the blank so that the imprint of the support is not deformed under the weight of the blank. The calculation module may be implemented via the circuitry or electronic circuits of the device in a similar manner as the first, second and third modules. For example, the calculation module may include machine executable instructions that are stored in the one or more non-transitory memories of the device and the processor executes these machine executable instructions so as to carry out the functions of the calculation module to determine the rigidity of the support.

Once the digital construction of the support for the blank is complete, the physical support is manufactured. The physical support may be produced from a thermoplastic material. The physical support may be produced in a known manner by additive manufacturing, or using conventional manufacturing methods (plastic deformation, molding, machining, etc.). Examples of a physical support 1, 2, 3 and 4 according to the invention are shown in FIGS. 2, 3, 4, 5 and 6.

The expression "between . . . and . . . " should be understood to include the limit values.

The invention claimed is:

1. A method for manufacturing a support with a shape of a fibrous blank obtained by three-dimensional weaving for use as a fibrous preform of a turbine engine blade or propeller after shaping and compaction in a mold comprising:
   providing a set of points representative of a face of the fibrous blank, said face being for forming a root of the blade or the propeller and a portion of an aerodynamic profile of the blade or the propeller,
   constructing a digital surface comprising all the points of said set of points, digitally designing the support comprising at least an imprint of the fibrous blank having a shape of the digital surface, and
   physically manufacturing the support based on the digitally designing;
   wherein providing said set of points comprises:
   providing a set of initial points representative of a face of the fibrous preform forming the root and a portion of the aerodynamic profile of the blade or the propeller, and
   transforming the set of initial points into the set of points by applying a transformation function corresponding to a reciprocal function of a function corresponding to the shaping and compaction of the fibrous blank into a fibrous preform in the mold.

2. The manufacturing method as claimed in claim 1, wherein the transformation function comprises at least one function corresponding to the compaction of the fibrous blank into a fibrous preform in the mold, said function corresponding to the compaction associating, with a dimension of a point of the fibrous blank, a dimension of a point of the fibrous preform, by multiplying the dimension of the point of the fibrous blank by a compaction factor such that:
   if the point of the blank belongs to a portion for forming the root of the blade or the propeller, a value of the compaction factor is between 83% and 100%;
   if the point of the blank belongs to a portion for forming a transition between the root and the aerodynamic profile of the blade or the propeller, the value of the compaction factor is between 50% and 84%;
   if the point of the blank belongs to a portion for forming the aerodynamic profile of the blade or the propeller, the value of the compaction factor is between 62% and 84%.

3. The manufacturing method as claimed in claim 1, wherein the digital design method further comprises determining a rigidity of the support to be designed depending on a weight of the blank so that an imprint of the support is not deformed under the weight of the blank.

4. The method as claimed in claim 3, wherein determining the rigidity of the support comprises designing at least one stiffener of the support.

\* \* \* \* \*